(12) United States Patent
Vidal et al.

(10) Patent No.: US 12,061,070 B2
(45) Date of Patent: Aug. 13, 2024

(54) MULTIPURPOSE BLAST, BALLISTIC RESISTANCE, THERMAL AND NOISE INSULATION NON-METALLIC WALL PANELS

(71) Applicant: SAUDI ARABIAN OIL COMPANY, Dhahran (SA)

(72) Inventors: Oscar Salazar Vidal, Dhahran (SA); Mohammed Al Mehthel, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/066,709

(22) Filed: Dec. 15, 2022

(65) Prior Publication Data
US 2024/0200913 A1  Jun. 20, 2024

(51) Int. Cl.
*F41H 5/24* (2006.01)
*B32B 7/08* (2019.01)
(Continued)

(52) U.S. Cl.
CPC .............. *F41H 5/24* (2013.01); *B32B 7/08* (2013.01); *B32B 13/042* (2013.01); *B32B 37/10* (2013.01); *B32B 37/24* (2013.01); *B32B 38/0004* (2013.01); *E04C 2/26* (2013.01); *E04C 2/46* (2013.01); *F41H 5/04* (2013.01); *B32B 2037/243* (2013.01); *B32B 2250/40* (2013.01); *B32B 2272/00* (2013.01);
(Continued)

(58) Field of Classification Search
CPC .......... F41H 5/24; B32B 27/08; B32B 13/042
USPC ....................................................... 89/36.04
See application file for complete search history.

(56) References Cited

U.S. PATENT DOCUMENTS

| 5,022,307 A | 6/1991 | Gibbons, Jr. et al. |
| 7,601,654 B2 * | 10/2009 | Bhatnagar ............. F41H 5/0485 428/920 |

(Continued)

FOREIGN PATENT DOCUMENTS

| CA | 3129262 A1 * | 8/2020 | ............. B29C 48/21 |
| EP | 2037206 A2 | 3/2009 | |

(Continued)

OTHER PUBLICATIONS

International Search Report and Written Opinion issued in Application No. PCT/US2023/084356, mailed on Mar. 26, 2024 (15 pages).

*Primary Examiner* — Samir Abdosh
(74) *Attorney, Agent, or Firm* — Osha Bergman Watanabe & Burton LLP

(57) ABSTRACT

A method includes providing a plurality of prefabricated parts for assembly, where the plurality of prefabricated parts comprises one or more rubber mats and a central core. The method also includes preparing one or more external surfaces of the central core, applying a sealer to the one or more external surfaces of the central core, applying a bonding agent primer and a top coat to the one or more external surfaces of the central core, and pressing the one or more rubber mats to the one or more external surfaces of the central core. The method further includes applying a constant pressure to the one or more rubber mats and the central core, where a combination of the one or more rubber mats and the central core forms a blast and ballistic resistance wall.

8 Claims, 2 Drawing Sheets

(51) Int. Cl.
  *B32B 13/04* (2006.01)
  *B32B 37/10* (2006.01)
  *B32B 37/24* (2006.01)
  *B32B 38/00* (2006.01)
  *E04B 2/00* (2006.01)
  *E04C 2/26* (2006.01)
  *F41H 5/04* (2006.01)

(52) U.S. Cl.
  CPC ..... *B32B 2307/538* (2013.01); *B32B 2307/56* (2013.01); *B32B 2307/7376* (2023.05); *B32B 2309/12* (2013.01); *B32B 2310/0843* (2013.01); *B32B 2607/00* (2013.01)

(56) References Cited

U.S. PATENT DOCUMENTS

| | | | | |
|---|---|---|---|---|
| 7,997,181 | B1* | 8/2011 | Tunis | F41H 5/0492 89/917 |
| 8,091,465 | B2* | 1/2012 | Ravid | F41H 5/007 89/36.02 |
| 9,096,039 | B2* | 8/2015 | Chmielewski | B32B 5/18 |
| 10,302,401 | B2 | 5/2019 | Whitaker | |
| 11,002,033 | B2* | 5/2021 | Pospisil | E04B 2/7457 |
| 2004/0123541 | A1 | 7/2004 | Jewett | |
| 2005/0096412 | A1* | 5/2005 | Petr | C04B 18/22 106/697 |
| 2008/0092730 | A1 | 4/2008 | Hall | |
| 2010/0297388 | A1* | 11/2010 | Dagher | F42D 5/045 977/773 |
| 2014/0196799 | A1* | 7/2014 | Hsu | B65D 90/24 137/312 |
| 2018/0290418 | A1* | 10/2018 | Nelson | B32B 27/08 |
| 2023/0304298 | A1* | 9/2023 | Baert | B29C 48/07 |

FOREIGN PATENT DOCUMENTS

| | | | | |
|---|---|---|---|---|
| EP | 3659676 | A1 * | 6/2020 | |
| EP | 4249543 | A1 * | 9/2023 | ............. B29C 48/07 |
| GB | 2482030 | A * | 1/2012 | ........... B32B 27/065 |
| GB | 2529396 | A | 2/2016 | |

* cited by examiner

MULTIPURPOSE BLAST, BALLISTIC RESISTANCE, THERMAL AND NOISE INSULATION NON-METALLIC WALL PANELS

BACKGROUND

Impact and blast resistance walls have been developed as a way to improve security in response to accidental explosions and increased terrorist attacks. Currently, there are many anti-blast wall products which exist commercially, where the walls are developed in a multilayer fashion. Such products are often overly expensive, particularly with respect to materials and assembly.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method. The method may include providing a plurality of prefabricated parts for assembly, where the plurality of prefabricated parts comprises one or more rubber mats and a central core. The method may also include preparing one or more external surfaces of the central core, applying a sealer to the one or more external surfaces of the central core, applying a bonding agent primer and a top coat to the one or more external surfaces of the central core, and pressing the one or more rubber mats to the one or more external surfaces of the central core. The method may further include applying a constant pressure to the one or more rubber mats and the central core, where a combination of the one or more rubber mats and the central core forms a blast and ballistic resistance wall.

In another aspect, embodiments disclosed herein relate to a blast and ballistic resistance wall, which may include an external rubber mat, an internal rubber mat, and a central core disposed between the external rubber mat and the internal rubber mat.

In yet another aspect, embodiments disclosed herein relate to a blast and ballistic resistance wall. The blast and ballistic resistance wall may include a structure and a rubber mat, where a first side of the rubber mat is adjacent to and fixed to the structure. The blast and ballistic resistance wall may further include a core disposed on a second side of the rubber mat.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-3, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a blast and ballistic resistance wall which may be fitted to a new structure or building. In another aspect, embodiments disclosed herein relate to a blast and ballistic resistance wall which may be retrofitted to an existing structure or building. In yet another aspect, embodiments disclosed herein relate to a method of assembling a blast and ballistic resistance wall.

Figure 1:
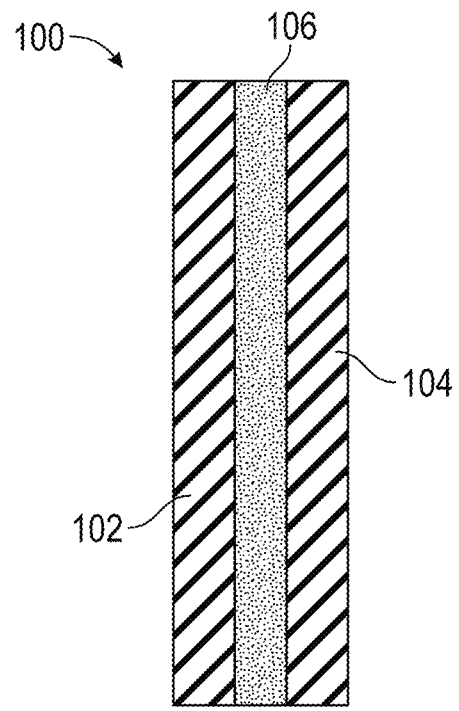
FIG. 1 shows a blast and ballistic resistance wall in accordance with one or more embodiments.

Turning first to FIG. 1, FIG. 1 shows a blast and ballistic resistance wall 100 in accordance with one or more embodiments. More specifically, FIG. 1 shows a blast and ballistic resistance wall 100 which may be installed on a new structure, such as a new building. The blast and ballistic resistance wall 100 may include an external rubber mat 102, an internal rubber mat 104, and a central core 106 disposed there between. In one or more embodiments, the external rubber mat 102 and the internal rubber mat 104 may be composed or recycled or virgin rubber sheets. For example, in some embodiments, the external rubber mat 102 and the internal rubber mat 104 may be composed of recycled tires, natural rubber, recycled ethylene propylene diene terpolymer (EPDM), or polyurethane. Polymer binding agents may also be used in the manufacture of the external rubber mat 102 and the internal rubber mat 104.

In one example, the external rubber mat 102 and the internal rubber mat 104 may be composed of a mixture of recycled ground rubber and a polyurethane binder. In such a mixture, the polyurethane ratio may be 25%-40% and may be formulated with a blowing agent to create a microcell structure during molding. In one or more embodiments, such a procedure may increase the R value, or insulation, of the external rubber mat 102 and the internal rubber mat 104 compared with conventional rubber solutions. In another example, injected carbon dioxide may be used as a blowing agent, which may increase the sustainability and effectiveness of carbon dioxide capturing of the blast and ballistic resistance wall 100. In one or more embodiments, it may be important to achieve a balance between a polyurethane virgin polymer and recycled rubber, since the virgin rubber phase, acting as a binder will be compounded with the blowing agent.

In one or more embodiments, the external rubber mat 102 and the internal rubber mat 104 may manufactured to have the properties listed in Table 1:

TABLE 1

| Property | Value | Units | STD |
|---|---|---|---|
| Total Thickness of panel system | 25-150 | Mm | |
| Density panel system | 1000-2000 | Kg/m3 | ASTM D 1817 |
| Specific Gravity (rubber face) | 1.1-1.3 | g/cm3 | ASTM D 1817 |
| Hardness (rubber face) | 45-60 | Shore A | ASTM D 2240 |
| Tensile Strength (rubber face) | 3000-5000 | Kpa | ASTM D 412 |
| Elongation (rubber face) | 100-600 | % | ASTM D 412 |
| Modulus 300% (rubber face) | 100-250 | Psi | ASTM D 412 |
| Damping ratio at 20 hz (rubber face) | 0.22 | | ASTM D 3999 |
| Tear Energy (rubber face) | 30 | Kj/N | ASTM D-624 |
| Compression set method B (24 hr/70° C./25% def.)-rubber face | 26 @ 25% | | ASTM D-395 |
| Ball Rebound: | 90-98 | % | DIN 18032/2 |
| Energy absorption, ballistic; high-velocity impact tests velocity of 140 m/s. (panel system) | 50-80 | Joules | |
| Blast resistance, simulated contact explosion of 0.5 kg of TNT, maximum energy absorbed in 1.5 miliseconds (panel system) | 8.0 | Megajoules | |

In one or more embodiments, the central core 106 may be composed of a resilient mixture intended to improve blast or impact resistance. The resilient mixture may differ depending on situational needs. In one or more embodiments, the resilient mixture may be composed of foam concrete or mortar, either alone or combined with recycled ground rubber or virgin rubber granulate fillers in 40%-50% by mass. In other embodiments, the resilient mixture may be composed of glass fiber reinforced polymer (GFRP) and recycled ground rubber or virgin granulate fillers. In further embodiments, the resilient mixture may be composed of fiberglass reinforced polymer (FRP), which may incorporate ground rubber, glass fiber, basalt fiber, and recycled fiber textile clothes, or which may be reinforced by recycled materials. FRP may refer to a broad category of fiberglass reinforced polymer materials, where GFRP is one material which may be incorporated into that broad category. In some embodiments, resilient mixtures of concrete or mortar with ground rubber or virgin granulate fillers incorporated may incorporate between 30-40% ground rubber. In order to achieve optimum incorporation, up to 2% of epoxy resin may be added to increase adhesion of rubber and concrete. This same formulation can be used as the overlay masonry in a thinner layer.

A polymer concrete may sometimes be used to form the central core 106, where a polymer is used as a binding agent in place of cement. In some embodiments, a commercial sandwich of an FRP skin and a polyurethane or polystyrene foam core with a total thickness ranging from 10 mm to 50 mm may be used as the central core 106. Further, in yet other embodiments, the central core 106 may be composed of fully recycled polyethylene terephthalate (PET). In some embodiments, the central core 106 may be composed of fully recycled compressed textile mats.

Figure 2:
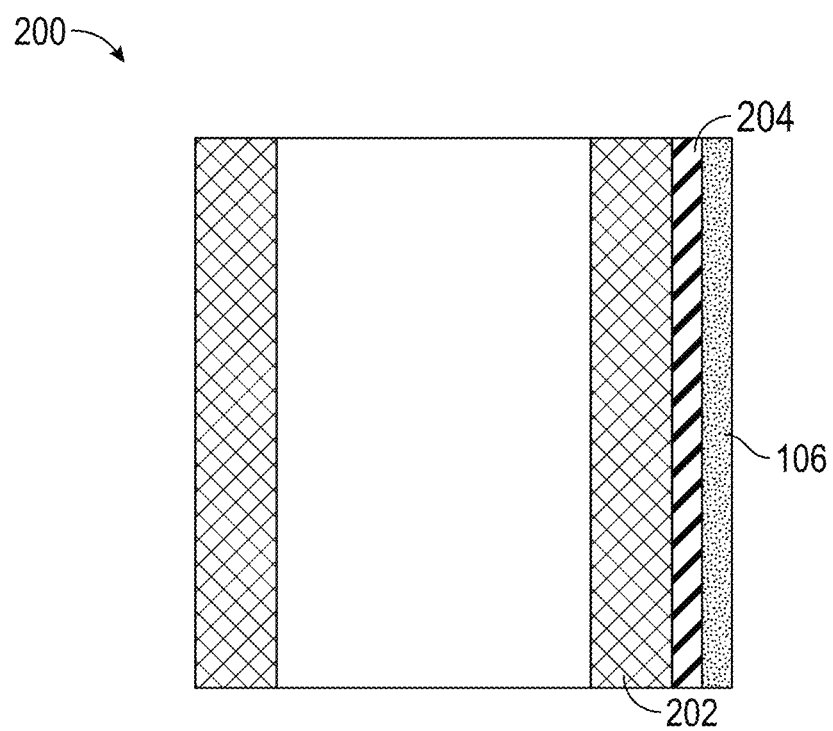
FIG. 2 shows a blast and ballistic resistance wall in accordance with one or more embodiments.

Turning now to FIG. 2, FIG. 2 shows a blast and ballistic resistance wall 200 in accordance with one or more embodiments. More specifically, FIG. 2 shows a blast and ballistic resistance wall 200 which may be retrofitted to an existing structure 202, such as an existing building. A rubber mat 204 may be installed flush with a wall of the structure 202. A core 106 may be installed on an opposite side of the rubber mat 204 to the structure 202.

Referring to both FIGS. 1 and 2, blast and ballistic resistance walls 100 and 200 may be described as sandwich type walls, which allow not only for a blast or impact resistant structure, but also a resistance wall 100, 200 able to resist deformation or collapse from an extreme impact or blow, either from an explosive device or an impact from a car, for example. With the installation of a blast and ballistic resistance wall 100, 200, the structure 202 may be able to resist the impact of bullets. Additionally, installation of a blast and resistance wall 100, 200 may provide additional thermal and noise insulation, which may result in a structure 202 with an improved energy efficiency. Further, the outer recycled rubber mats on the front and back surfaces of sandwich may improve the support and integrity of the blast and ballistic resistance wall 100, 200 to effectively resist the damage caused by the contact explosion load without the need to be replaced after one event. In one or more embodiments, the thickness of the central core 106 can be increased to substantially improve blasting, seismic, impact resistance and noise reduction.

In one or more embodiments, each of the rubber mats 102, 104, 204 and the central core 106 may be formed in a rectangular shape, with a length to width ratio ranging from 1 to 2 (e.g., a length ranging from 1 to 2 m and a width of 1 m), and a thickness ranging from 25 mm to 150 mm. In one or more embodiments, the number of layers included in the blast and ballistic resistance walls 100, 200 may vary depending on situational needs. For example, in some embodiments, the blast and ballistic resistance walls 100, 200 may have one, two, or three layers, where FIG. 1 shows a blast and ballistic resistance wall 100 with three layers, and FIG. 2 shows a blast and ballistic resistance wall 200 with two layers.

Figure 3:
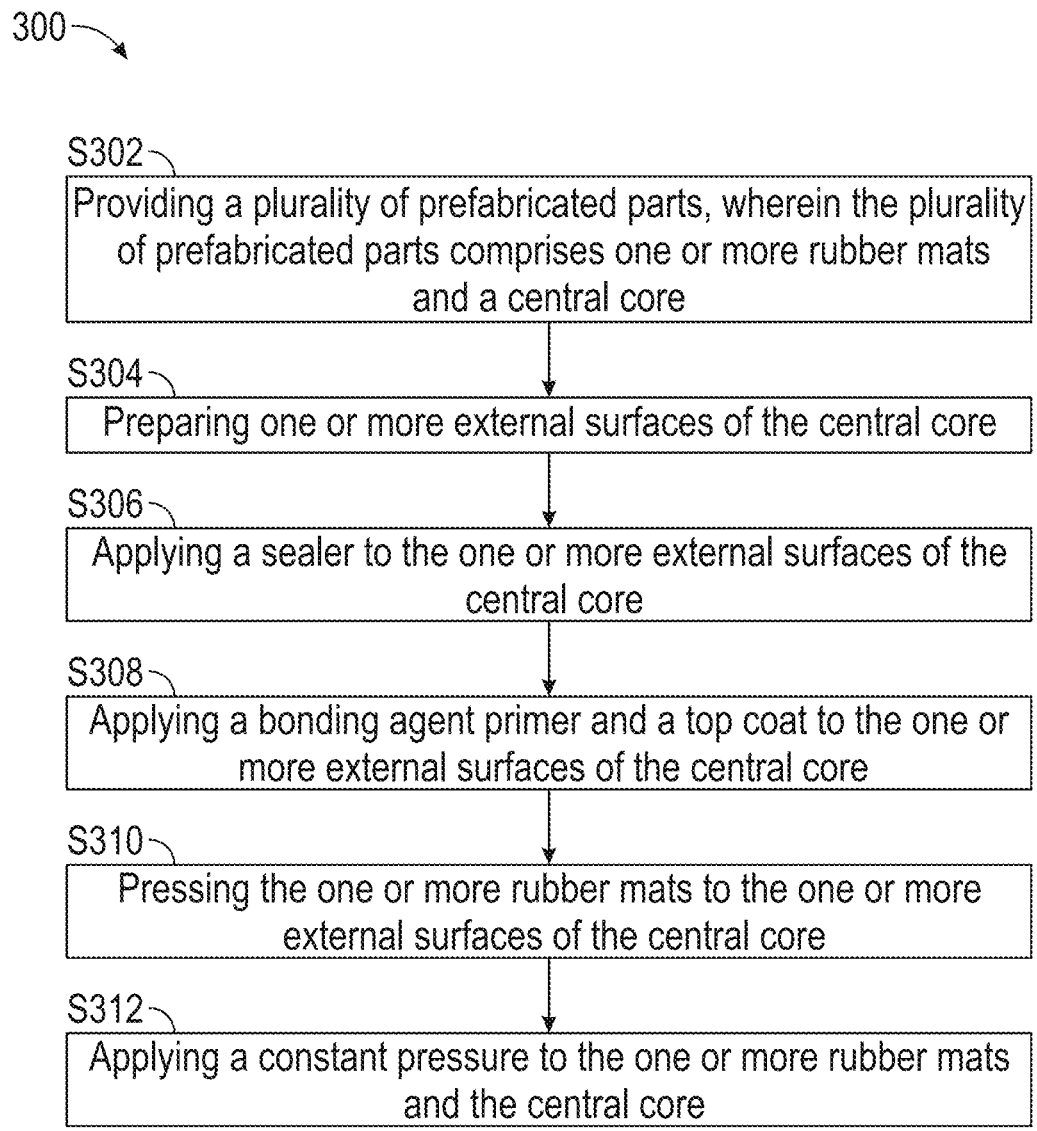
FIG. 3 shows a flowchart of a method in accordance with one or more embodiments.

FIG. 3 depicts a flowchart in accordance with one or more embodiments. More specifically, FIG. 3 depicts a flowchart 300 of a method of assembling a blast and ballistic resistance wall in accordance with one or more embodiments. Further, one or more blocks in FIG. 3 may be performed by one or more components as described in FIGS. 1-2. While the various blocks in FIG. 3 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a plurality of prefabricated parts may be provided, S302. In one or more embodiments, the plurality of prefabricated parts may include one or more rubber mats 102, 104, 204 and a central core 106. In one or more embodiments, the one or more rubber mats 102, 104, 204 may be fabricated from recycled tires. One or more external surfaces of the central core 106 may be prepared, S304. In one or more embodiments, preparing the one or more external surfaces of the central core 106 may include roughening the external surfaces to create mechanical locking points. In other embodiments, preparing the one or more external surfaces may include performing laser surface texturing to increase microroughness. Roughening the one or more external surfaces or performing laser surface texturing may allow for stronger mechanical interlocking of adhesives and substrates, increasing the bonding between the central core 106 and the one or more rubber mats 102, 104, 204. This surface preparation may also allow for the use of a single layer adhesive, such as an oil-based polymer to cold cure while molding with the one or more rubber mats 102, 104, 204.

A sealer may then be applied to the one or more external surfaces of the central core 106 to fill any porosity, S306. Further, a bonding agent primer and a top coat may be applied to the one or more external surfaces of the central core 106, S308. In one or more embodiments, this may facilitate the chemical bonding of the one or more rubber mats 102, 104, 204 to the central core 106 or the application of a single layer adhesive. In one or more embodiments, the single layer adhesive may be rubber based or acrylic based.

The one or more rubber mats 102, 104, 204 may be pressed to the one or more external surfaces of the central core 106, S310. Once the one or more rubber mats 102, 104, 204 and the central core 106 are aligned and pressed together, a constant pressure may be applied, S312. In one or more embodiments, the constant pressure may range from 40 to 60 psi (e.g., 50 psi) and may be applied for between 5 and 20 minutes (e.g., around 10 minutes) to encourage appropriate bonding between the one or more rubber mats 102, 104, 204 and the central core 106.

In one or more embodiments, the one or more rubber mats 102 104, 204 and the central core 106 may be reinforced with a plurality of mechanical attachments positioned at one or more corners of the one or more rubber mats 102, 104, 204. The mechanical attachments may be, for example, nails composed of fiberglass reinforced polymer (FRP), high density polyethylene (HDPE), or polypropylene (PP). Such materials may assist in maintaining thermal insulation.

Embodiments of the present disclosure may provide at least one of the following advantages. In one or more embodiments, employing a sandwich wall structure, such as blast and ballistic resistance walls 100, 200, may provide a multipurpose blast, ballistic and noise resistance, as well as thermal insulation. The recycled rubber mats 102, 104, 204 on the front and back surfaces of central core 106 will improve the support and integrity of the blast and ballistic resistance walls 100, 200 to effectively resist the damage caused by a contact explosion load without the need to be replaced after one event. The thickness of central core 106 can be increased to substantially improve blasting, seismic, impact resistance and noise reduction.

Further, the manufacture and production of the rubber mats 102, 104, 204 may utilize recycled materials, which may improve sustainability, reduce environmental impact, and reduce polymer pollution. For example, the rubber mats 102, 104, 204 may be formed from recycled scrap tires. In addition, use of recycled materials may assist in lowering carbon and water footprints. Installation and maintenance of the blast and ballistic resistance walls 100, 200 may be relatively simple in comparison to currently commercially available solutions. In particular, the blast and ballistic resistance walls 100, 200 are particularly lightweight, increasing ease of installation and handling.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method, comprising:
providing a plurality of prefabricated parts for assembly, wherein the plurality of prefabricated parts comprises one or more rubber mats and a central core;
preparing one or more external surfaces of the central core;
applying a sealer to the one or more external surfaces of the central core;
applying a bonding agent primer and a top coat to the one or more external surfaces of the central core;
pressing the one or more rubber mats to the one or more external surfaces of the central core; and
applying a constant pressure to the one or more rubber mats and the central core,
wherein a combination of the one or more rubber mats and the central core forms a blast and ballistic resistance wall.

2. The method of claim 1, further comprising reinforcing the one or more rubber mats and the central core with a plurality of mechanical attachments positioned at one or more corners of the one or more rubber mats.

3. The method of claim 1, wherein preparing one or more external surfaces of the central core comprises roughening the one or more external surfaces to create a plurality of mechanical locking points or performing laser surface texturing to increase microroughness.

4. The method of claim 1, wherein applying a sealer to the one or more external surfaces of the central core comprises filling porosity in the one or more external surfaces.

5. The method of claim 1, wherein applying a constant pressure comprises applying 40-60 psi to the one or more rubber mats and the central core for 5-15 minutes to create a bond between the one or more rubber mats and the central core.

6. The method of claim 1, further comprising integrating the blast and ballistic resistance wall into a structure, wherein the structure is a new building or an existing building.

7. The method of claim 6, wherein the plurality of prefabricated parts comprises two rubber mats and the central core, and wherein the two rubber mats are pressed to opposite external surfaces of the central core.

8. The method of claim 6, further comprising fabricating the one or more rubber mats from a plurality of recycled tires.

* * * * *